United States Patent [19]

Lloyd et al.

[11] Patent Number: 5,361,481
[45] Date of Patent: Nov. 8, 1994

[54] METHOD OF ASSEMBLING AN AUTOMATIC STORAGE AND RETRIEVAL SYSTEM

[75] Inventors: Kurt M. Lloyd, Pewaukee, Wis.; LaMar A. Jones, Sandy, Utah; David M. White, New Berlin; Christopher L. Roth, West Allis, both of Wis.

[73] Assignee: Harnischfeger Engineers, Inc., Brookfield, Wis.

[21] Appl. No.: 42,243

[22] Filed: Apr. 2, 1993

[51] Int. Cl.5 .......................................... B23P 19/04
[52] U.S. Cl. .................................. 29/469; 29/407; 29/897
[58] Field of Search ................. 29/407, 425, 428, 462, 29/469, 897, 897.3, 897.31, 897.312; 52/745; 198/468.6, 774; 414/10–12, 277–281, 266, 267, 589, 919

[56] References Cited

U.S. PATENT DOCUMENTS

| | | | |
|---|---|---|---|
| 3,631,993 | 1/1972 | Young | 414/281 |
| 3,638,575 | 2/1972 | Griner | 414/277 X |
| 3,927,773 | 12/1975 | Bright | 414/280 X |
| 3,950,913 | 4/1976 | Mori | 414/12 X |
| 4,054,014 | 10/1977 | van der Lely | 414/12 X |
| 4,712,964 | 12/1987 | van Elten et al. | 198/463.6 X |
| 4,722,653 | 2/1988 | Williams et al. | 29/33 P X |
| 4,733,896 | 3/1988 | Klein | 29/428 X |
| 4,756,657 | 7/1988 | Kinney | 414/281 |
| 4,773,807 | 9/1988 | Kroll et al. | 414/282 |
| 5,044,859 | 9/1991 | Sorensen et al. | 414/282 X |
| 5,226,782 | 7/1993 | Rigling | 414/280 X |

FOREIGN PATENT DOCUMENTS

| | | |
|---|---|---|
| 0241189 | 10/1987 | European Pat. Off. . |
| 0329642 | 8/1989 | European Pat. Off. . |
| 1547586 | 9/1967 | France . |
| 2630412 | 10/1989 | France . |
| 1235560 | 9/1967 | Germany . |
| 2002749 | 7/1971 | Germany . |
| 2313429 | 6/1974 | Germany . |
| 2130186 | 5/1984 | United Kingdom . |

Primary Examiner—Peter Dungba Vo
Attorney, Agent, or Firm—Michael, Best & Friedrich

[57] ABSTRACT

An automatic storage and retrieval system comprising a main track having an end, a storage rack which is adapted to be fixed adjacent the track and which defines a plurality of storage locations, a storage and retrieval machine which moves along the track and which places objects in and removes objects from the storage locations, and a maintenance module fixed adjacent the end of the track so that the maintenance module serves as a maintenance area for the storage and retrieval machine, the module also providing a container for packaging the storage and retrieval machine for shipping.

20 Claims, 14 Drawing Sheets

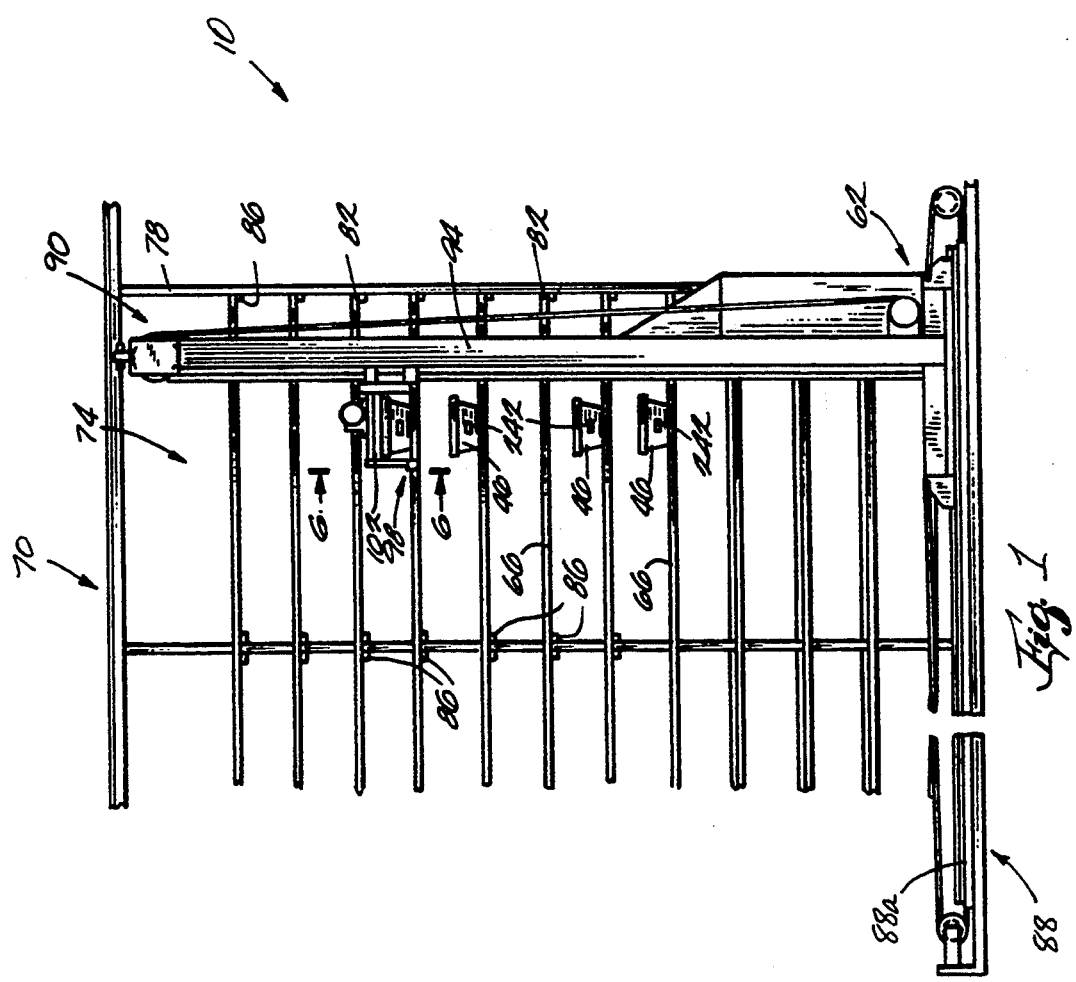

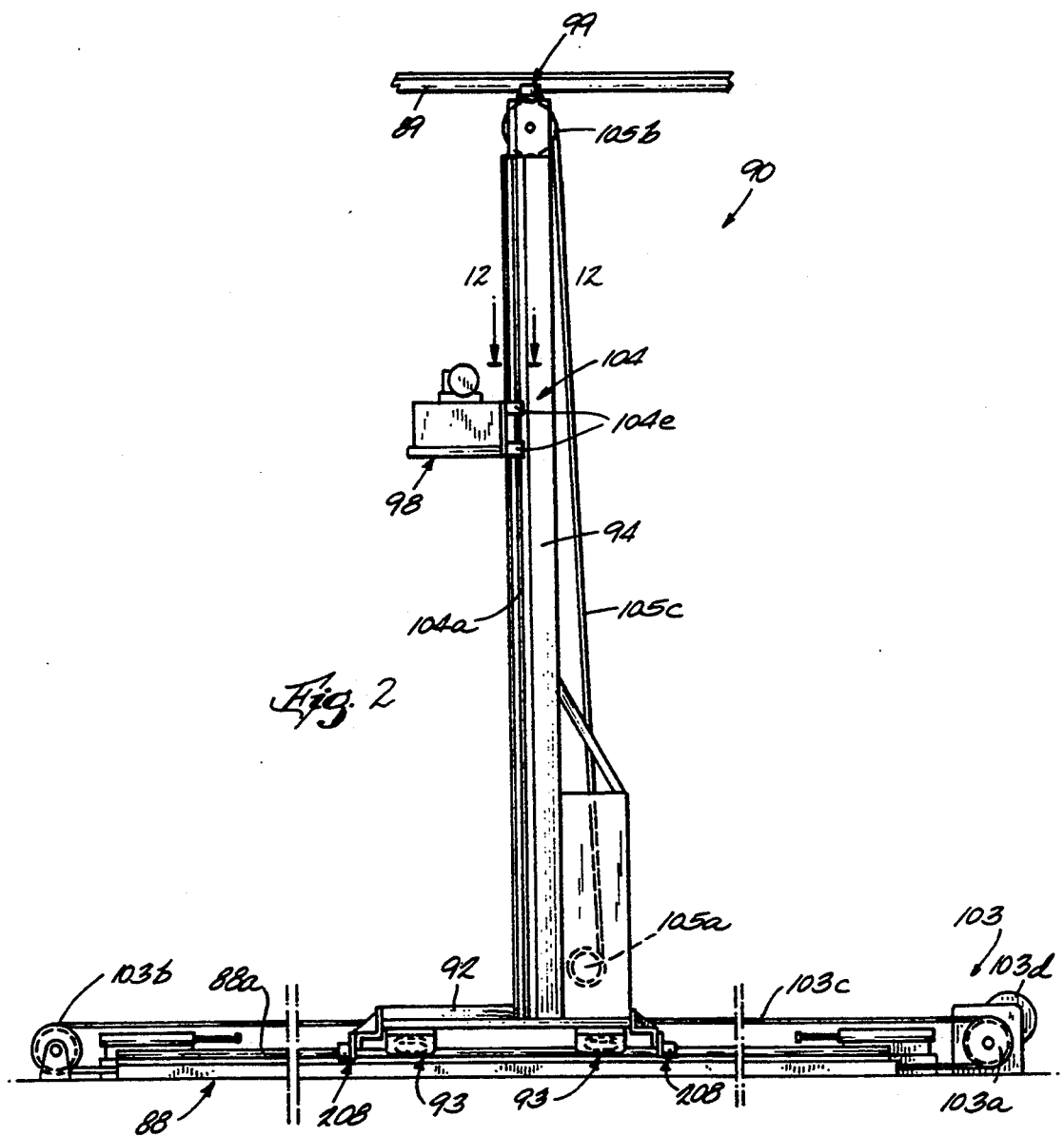
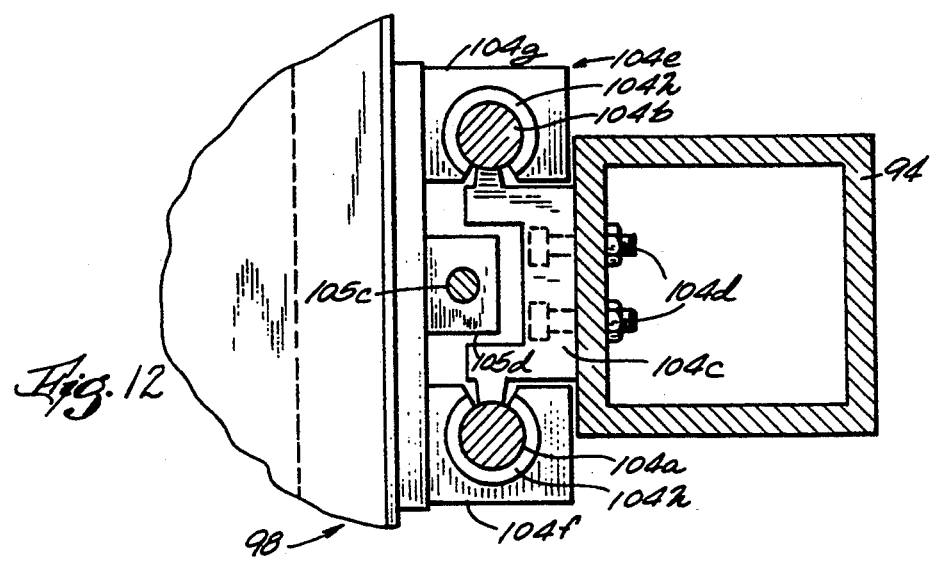

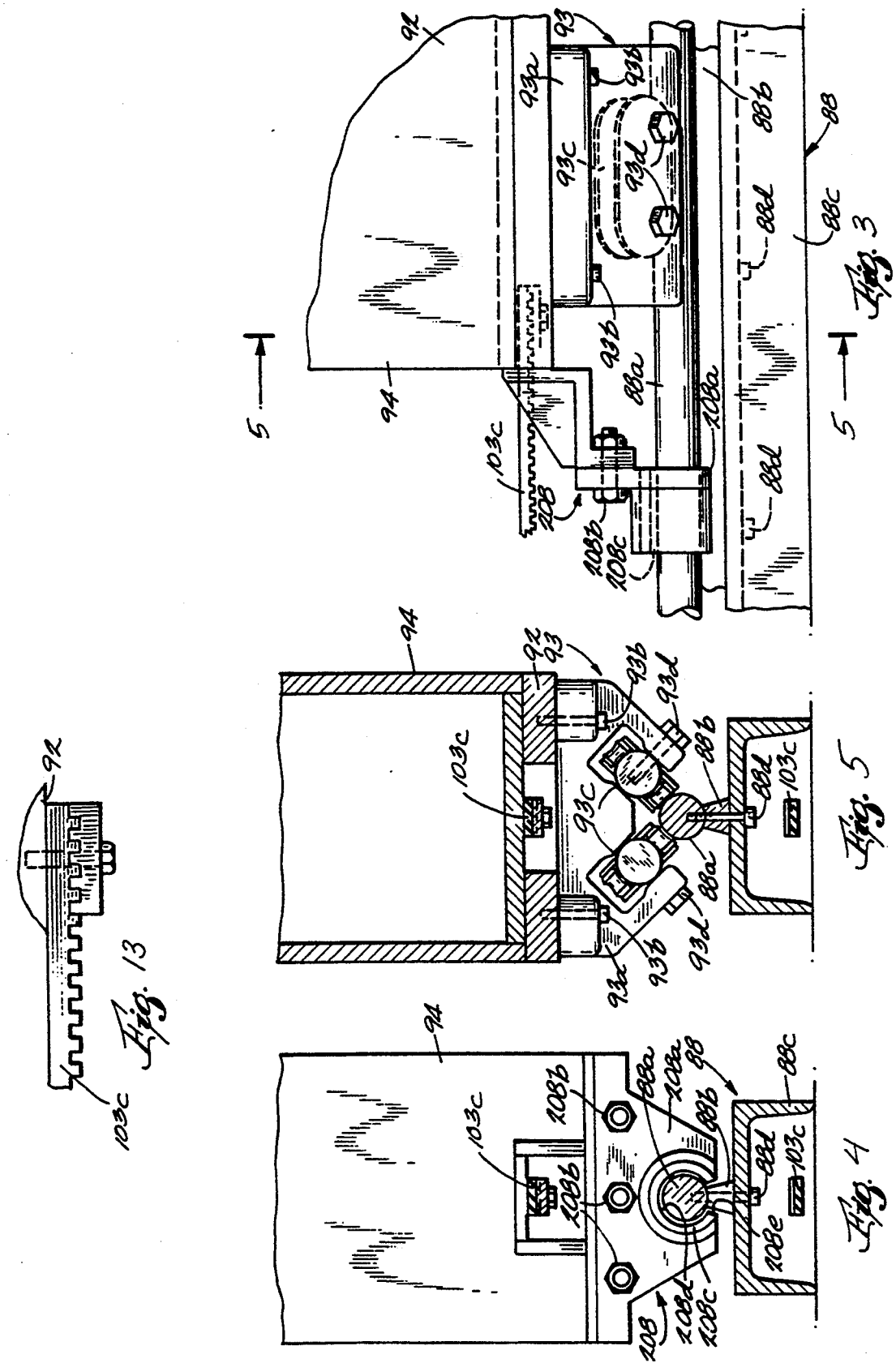

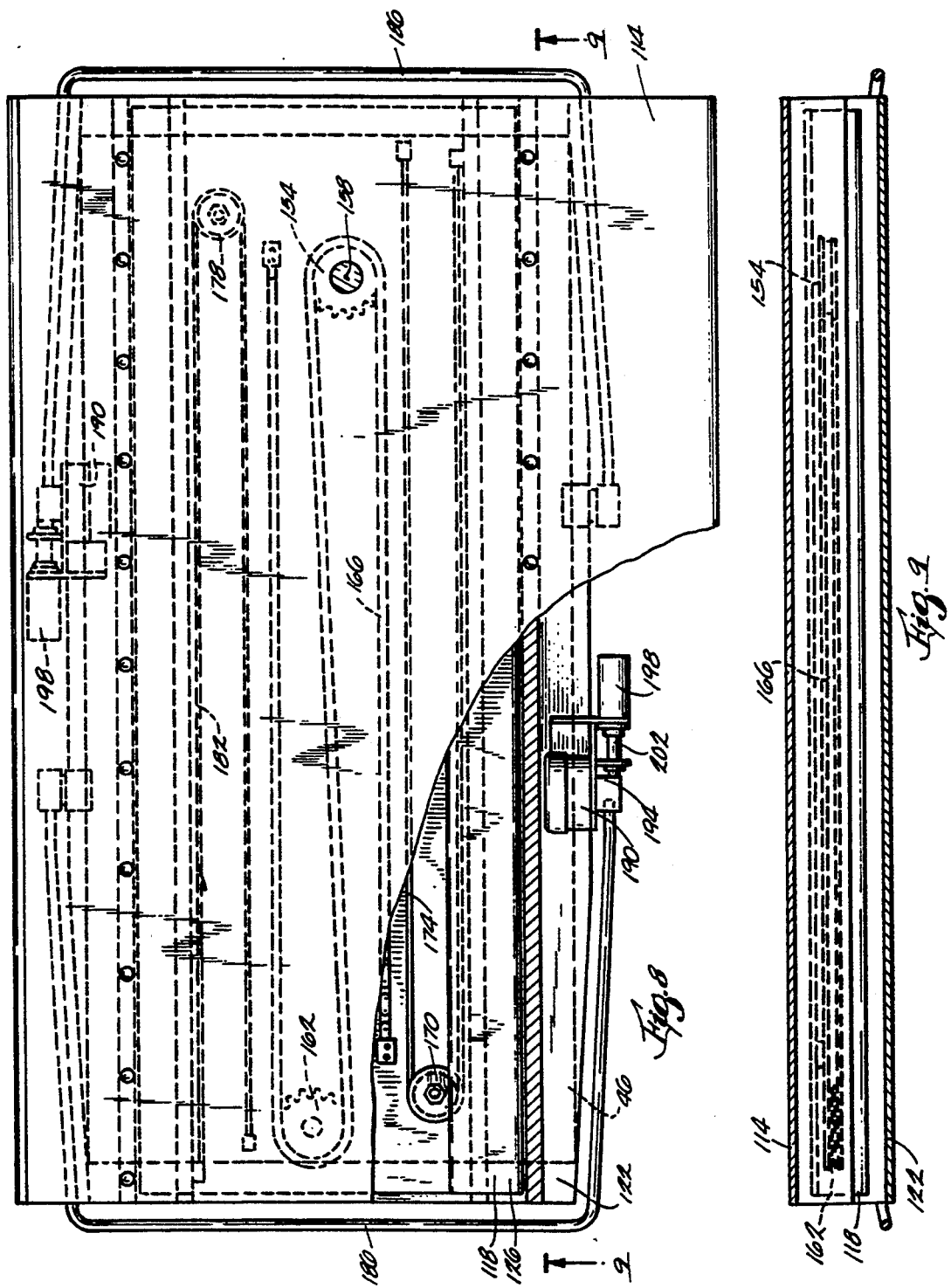

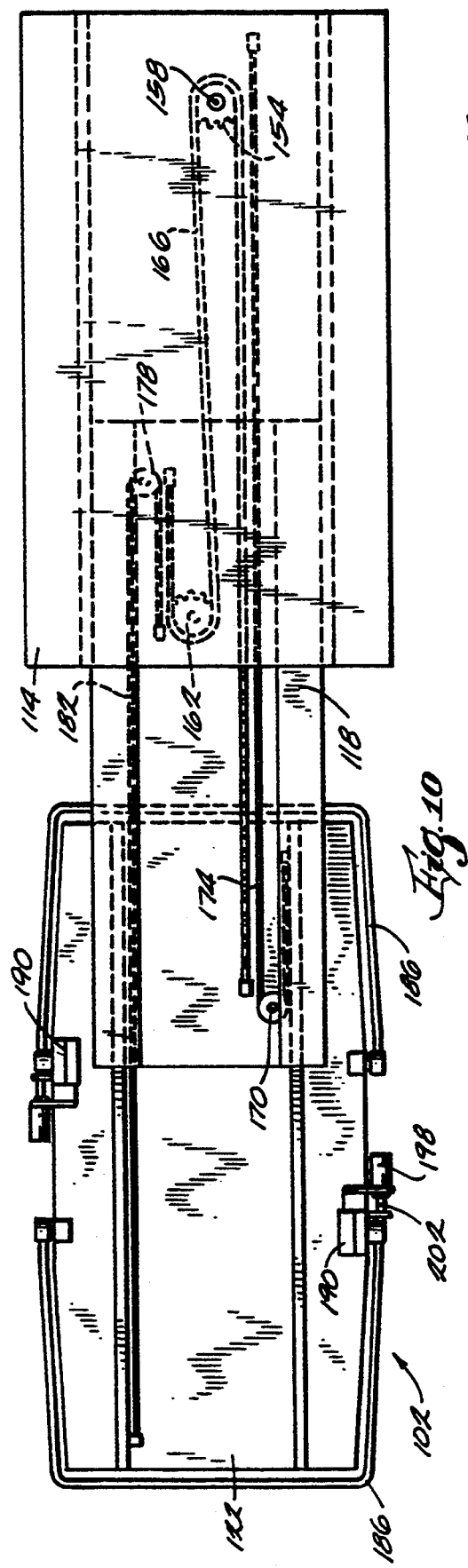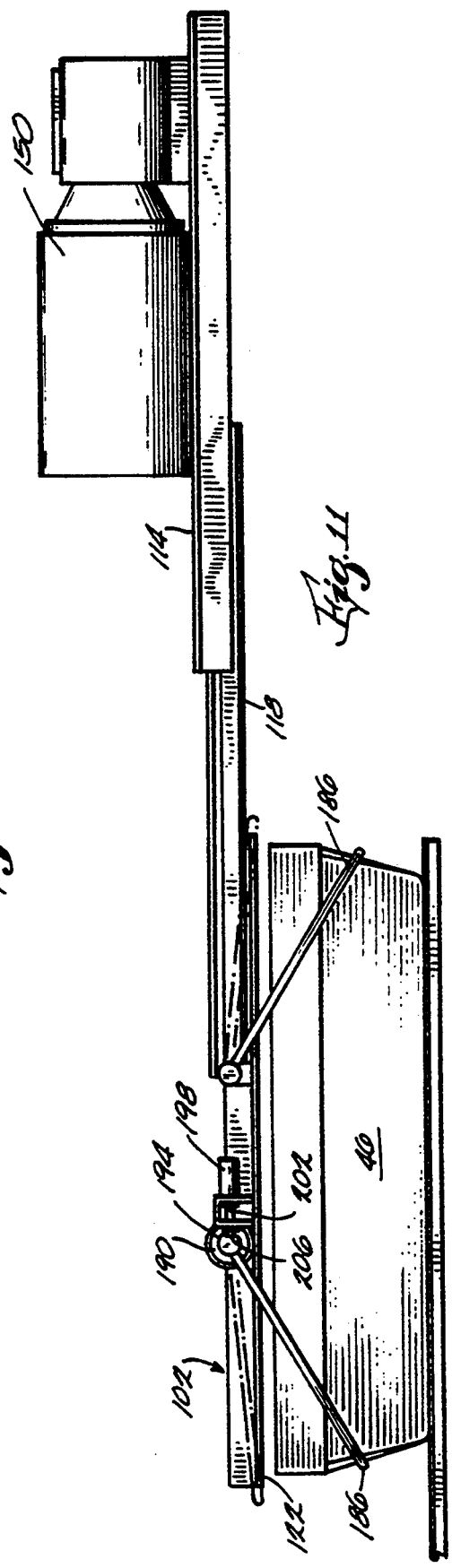

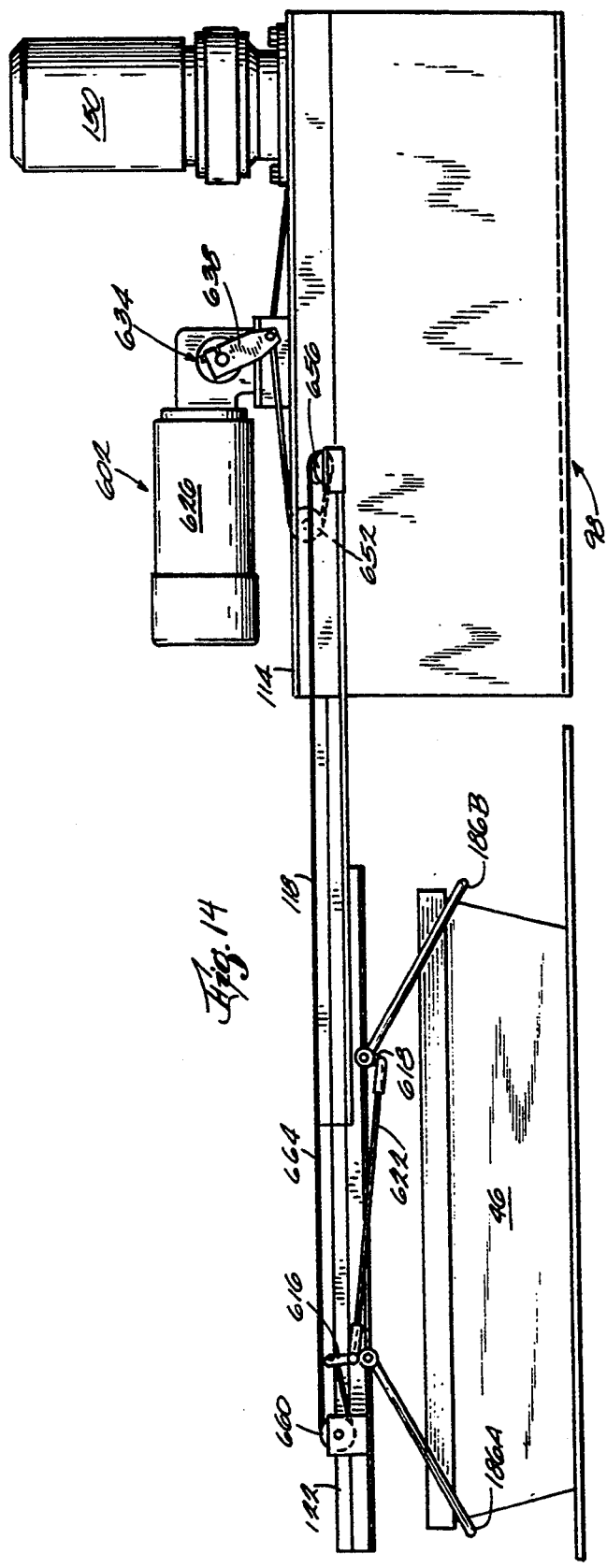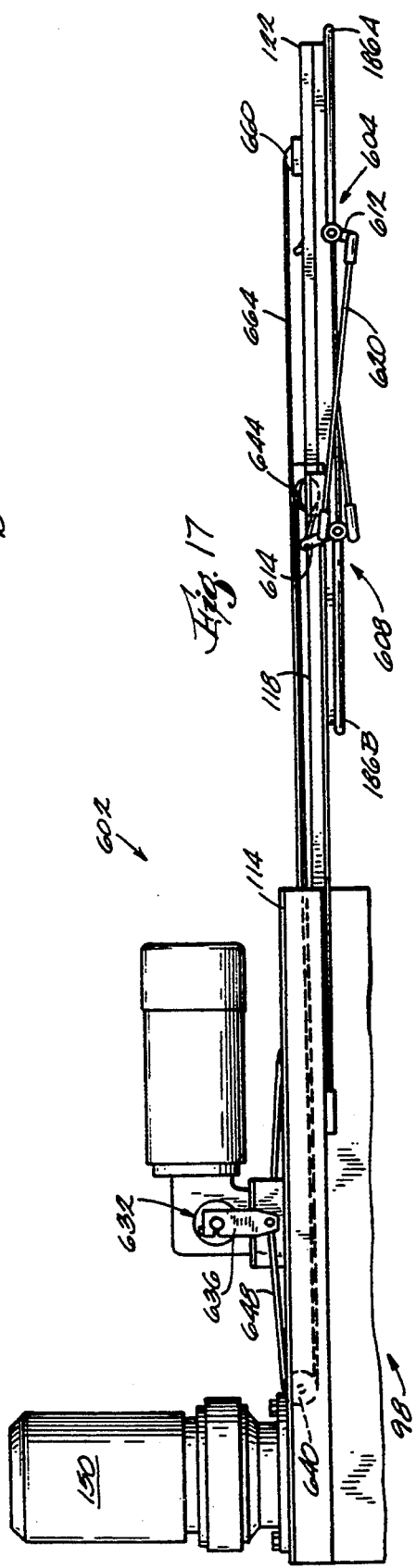

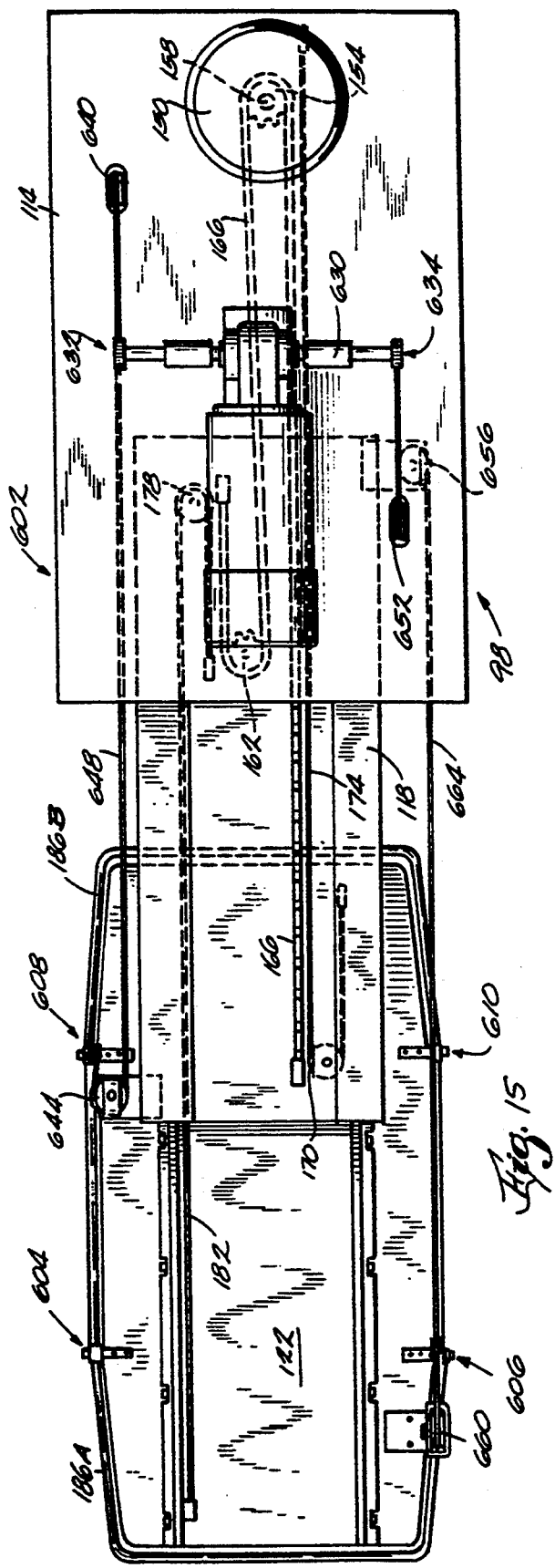

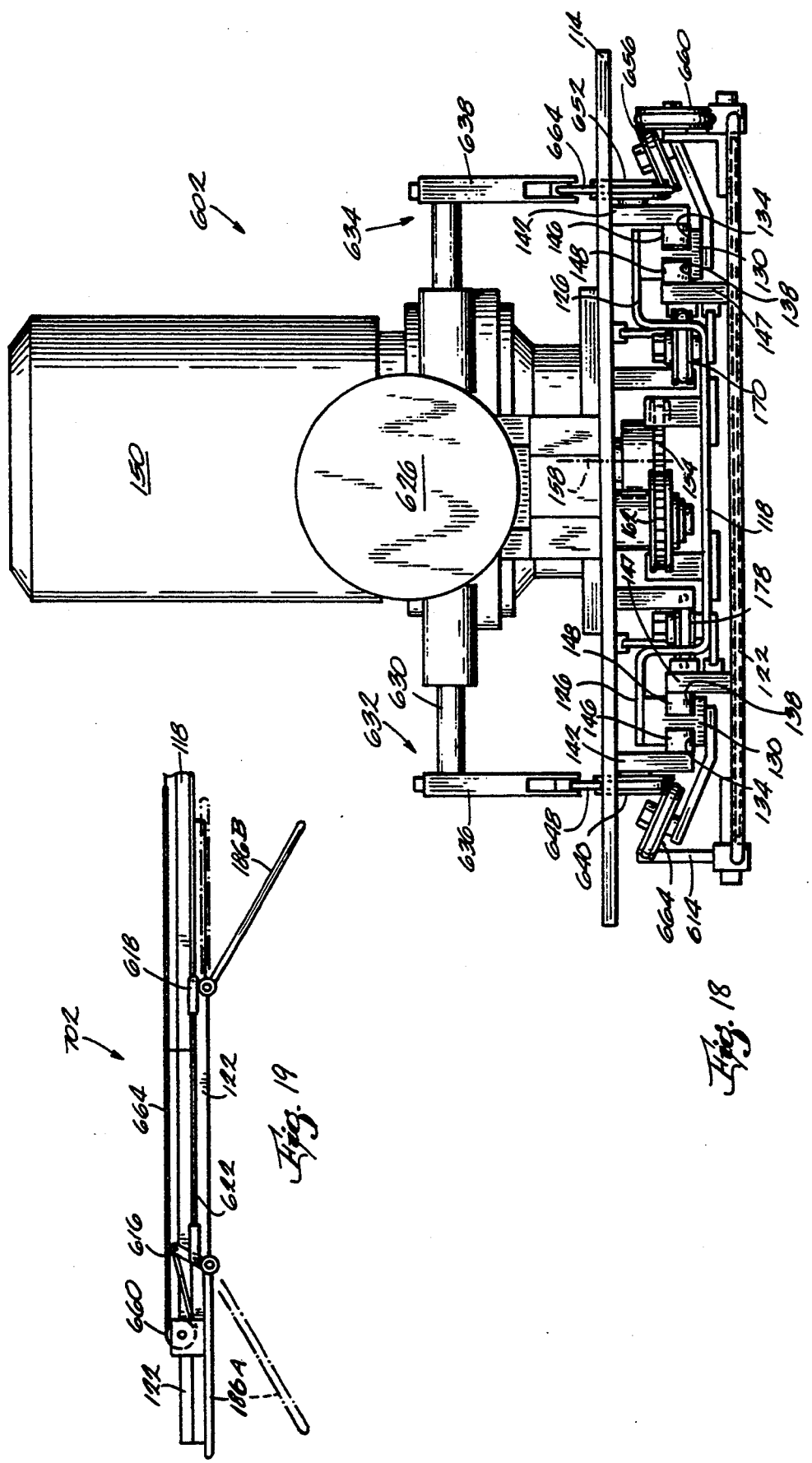

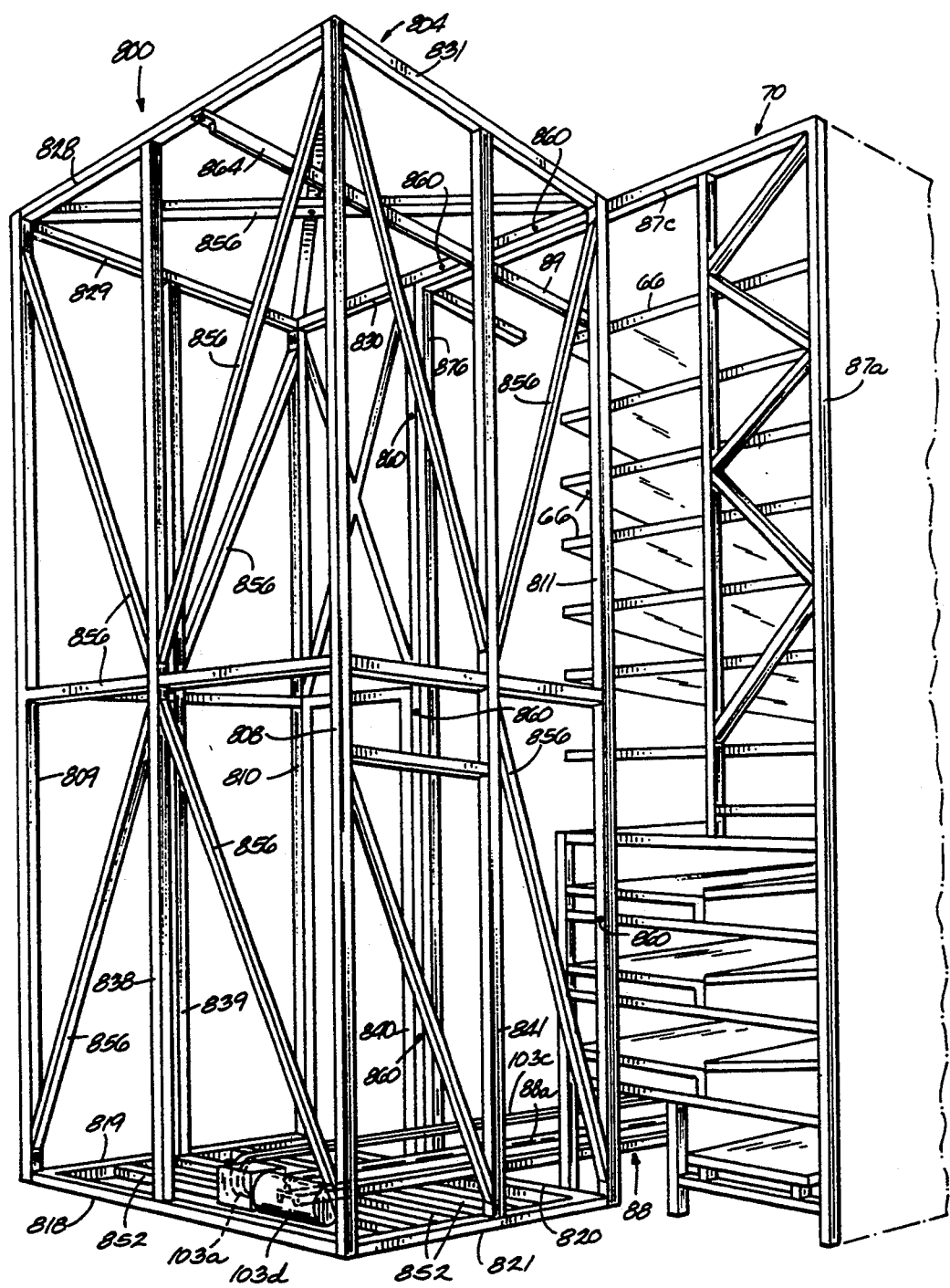

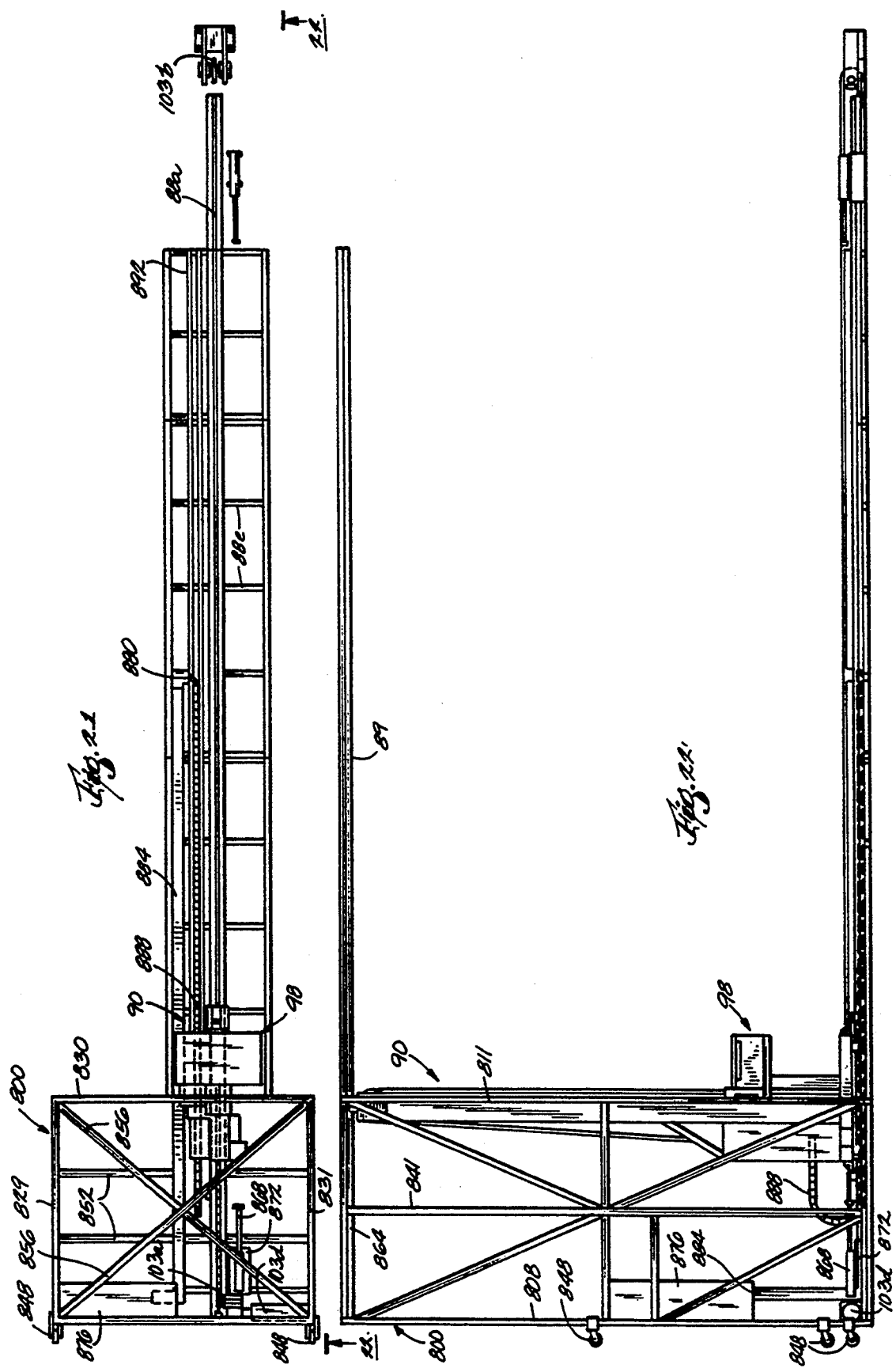

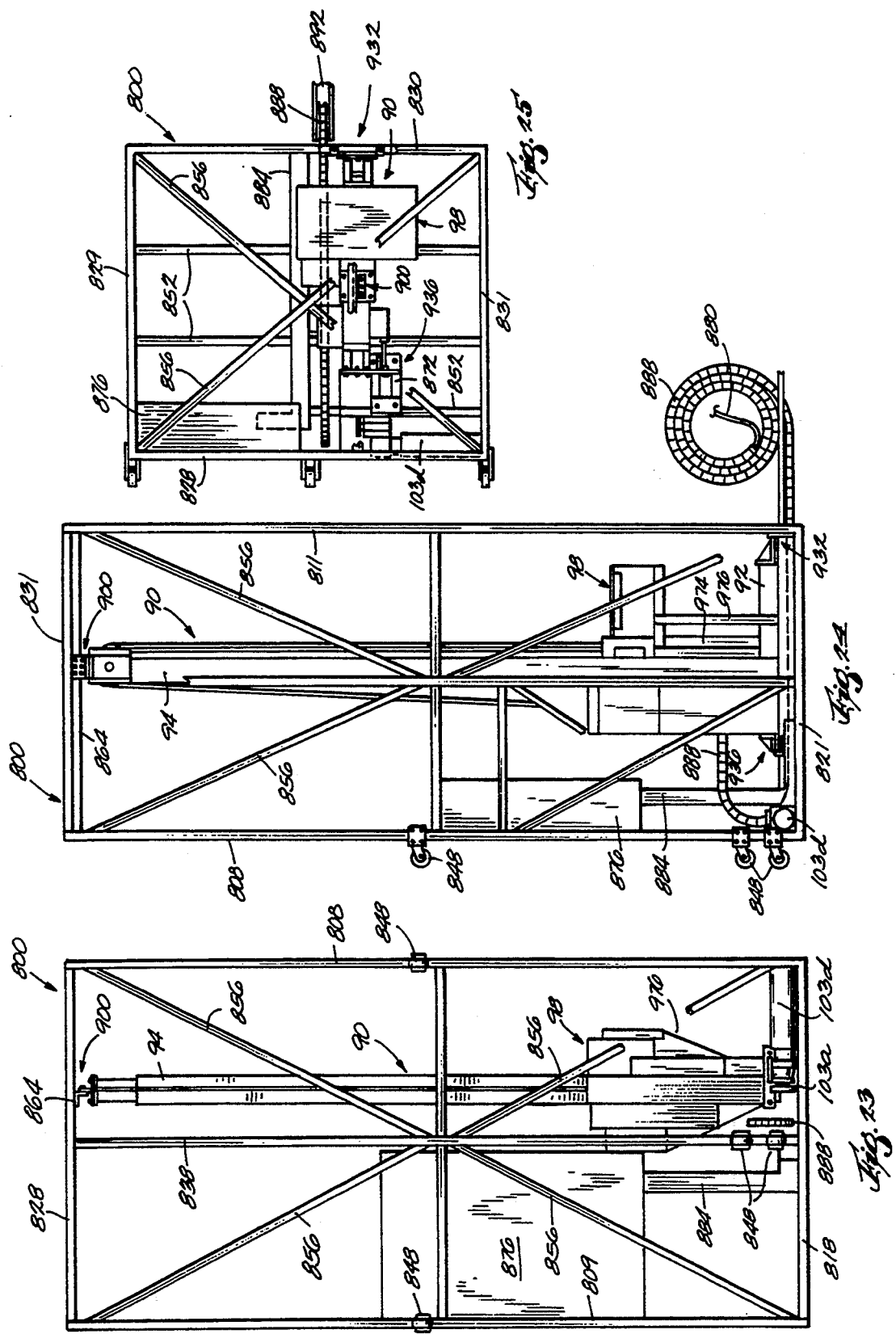

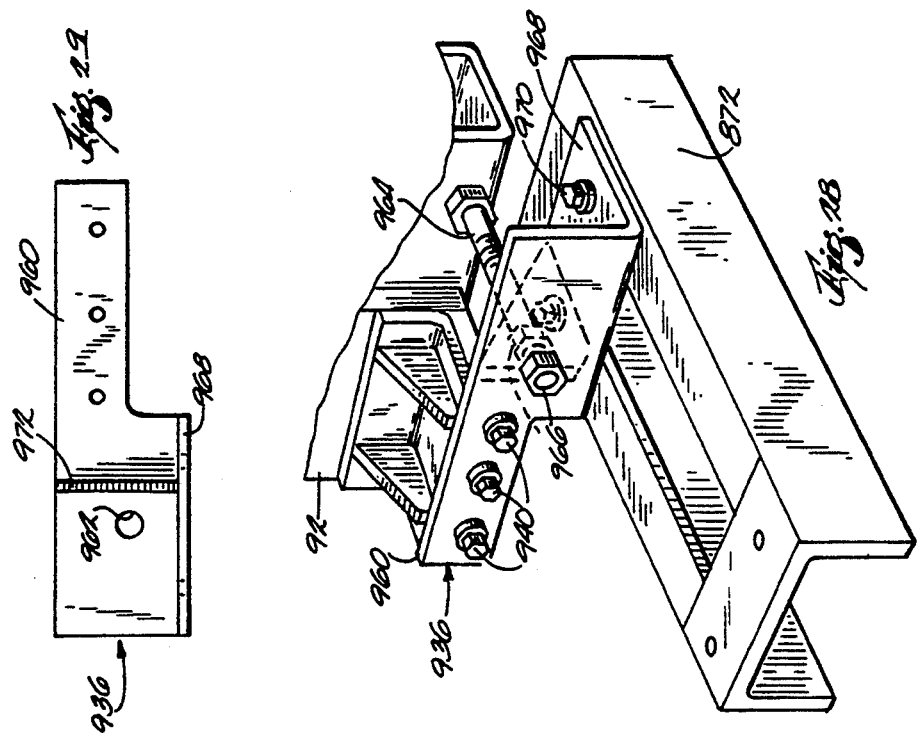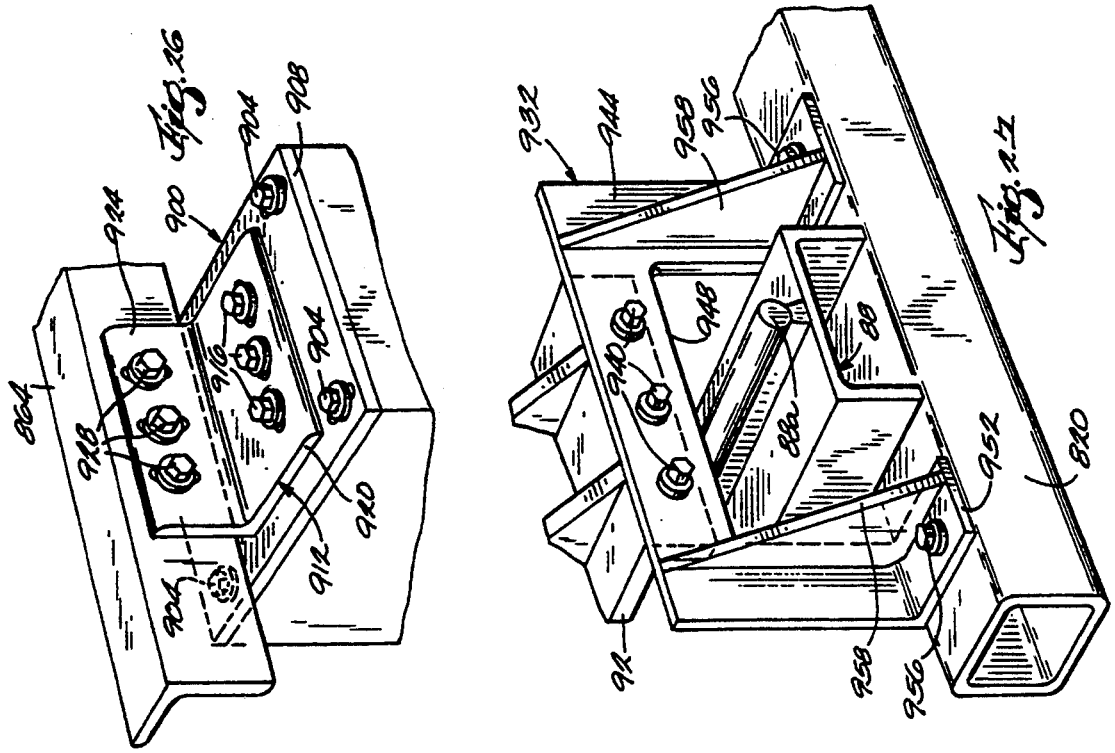

METHOD OF ASSEMBLING AN AUTOMATIC STORAGE AND RETRIEVAL SYSTEM

RELATED APPLICATIONS

Reference is made to the following applications which were filed concurrently herewith and which are incorporated herein by reference:

U.S. Ser. No. 042,418, filed Apr. 2, 1993, titled SYSTEM FOR AUTOMATICALLY STAGING LETTERS USED IN CONNECTION WITH A LETTER SORTING MACHINE (Attorney Docket No. 43102/9009) now pending.

U.S. Ser. No. 042,255, filed Apr. 2, 1993, titled AUTOMATIC STORAGE AND RETRIEVAL SYSTEM (Attorney Docket No. 43102/9010) now pending.

U.S. Ser. No. 042,241, filed Apr. 2, 1993, titled REAL-TIME INTERRUPT DRIVEN PC CONTROL FOR A STORAGE AND RETRIEVAL MACHINE (Attorney Docket No. 43102/9011) now pending.

FIELD OF THE INVENTION

The invention relates to material handling systems, and more particularly to automatic storage and retrieval systems including storage and retrieval machines for placing objects in and retrieving objects from staging or storage locations, such as are provided by storage racks. The invention also relates to methods for assembling automatic storage and retrieval systems.

BACKGROUND OF THE INVENTION

Automatic storage and retrieval systems are used in warehouses or other facilities in which objects are to be temporarily stored. A known storage and retrieval system includes a storage rack defining storage compartments or locations, and a storage and retrieval machine (SRM) operable to deposit objects in designated storage locations on the storage rack and to retrieve those objects when desired. The storage and retrieval machine is supported for horizontal movement along a track, and the machine includes a vertically extending mast that supports a carriage for vertical movement. The carriage supports an extractor or shuttle mechanism that is horizontally extendable beneath an object and retractable from beneath the object so that the object can be lifted from or lowered onto the storage rack.

SUMMARY OF THE INVENTION

Before an automatic storage and retrieval system is implemented at a new site, the storage and retrieval machine is typically tested on a test apparatus at the manufacturing facility. Testing is followed by removal of the storage and retrieval machine from the test apparatus. In prior art systems, this involves completely disconnecting the storage and retrieval machine from all control and power equipment, and disassembling the machine for shipment to the new site. After shipping, the storage and retrieval machine is reassembled on a track and storage rack at the new site, rewired and reconnected to an on-site power source, and reintegrated with controls at the new site, the controls being shipped separate from the machine. Thereafter, the storage and retrieval machine and on-site control unit are subjected to vehicle/system testing, adjustment, and general debugging operations. This initial set-up is time consuming and may delay operation of the system for as much as a week or more.

The invention provides an automatic storage and retrieval system including a shipping module in which the storage and retrieval machine and its associated control equipment are shipped as a unit from one site (i.e., the manufacturing facility) to another. The shipping module contains and protects those system components during shipment and permits the storage and retrieval machine to be shipped to the new site prewired, fully tested, and substantially operational. The shipping module preferably forms an integral part of the system at the new site and includes a modular frame that is quickly attachable to a preassembled track and storage rack at the new site. The storage and retrieval machine and its controls are thereafter easily integrated into the system to make it operational within a matter of hours, instead of days as is the case with prior art systems.

More particularly, the shipping module, includes a frame that serves as a shipping container for the storage and retrieval machine, its electrical controls, and a portion of its drive mechanism. The frame is easily disconnected from a test apparatus, and includes an upper rail segment that extends the upper rail on the test apparatus so that the storage and retrieval machine can be pulled within the frame. To ready the machine for shipment, retainer assemblies (used to maintain the machine on the track) at the front and rear of the machine are replaced with brackets that are fastened to the frame, and the roller assembly on top of the mast is replaced with a bracket that is fastened to the upper rail segment. The carriage is also fixed against movement along the mast via a block and strap arrangement. Additionally, the control unit is disconnected from the test apparatus power source, and an "umbilical cord" used to electrically connect the storage and retrieval machine to the control unit is disconnected and, along with its protective chain-like sheath, rolled up and secured within the frame. After a drive belt is removed from the drive mechanism, the shipping module is tipped onto casters for mobility and to facilitate loading and unloading the shipping module onto and off a transport vehicle.

Once at the new site, the shipping module is unloaded, rolled into position next to the storage rack, and attached as an integral part of the storage rack. Thereafter, the retainer and roller assemblies are replaced on the storage and retrieval machine to support the machine for horizontal movement along the track and the upper rail, the umbilical cord sections are unrolled and reconnected, the control unit is connected to the site power source, and a suitable drive belt is mounted on the drive mechanism and connected to the storage and retrieval machine. Once installed the shipping module provides a permanent maintenance bay or area for the storage and retrieval machine.

Thus, once the storage and retrieval machine has been set up, debugged and fully tested at the manufacturing facility it is easily disconnected from the test apparatus for shipping. At the new site the shipping module is easily connected as an integral part of the new system with, at most, minimal debugging or fine tuning of the machine being required to make the system fully operational.

Other features and advantages of the invention will become apparent to those skilled in the art upon review of the following detailed description, claims and drawings.

DESCRIPTION OF THE DRAWINGS

FIG. 1 is partial side elevational view of an automatic storage and retrieval system embodying the invention.

FIG. 2 is an enlarged side elevational view of the storage and retrieval machine shown in FIG. 1.

FIG. 3 is an enlarged view of a portion of the storage and retrieval machine shown in FIG. 2.

FIG. 4 is a left end view of the storage and retrieval machine portion shown in FIG. 3.

FIG. 5 is a view taken along line 5—5 in FIG. 3.

FIG. 8 is a top plan view, partially broken away, of the carriage and extractor assembly shown in FIG. 6.

FIG. 9 is a view taken along line 9—9 in FIG. 8.

FIG. 10 is a reduced top plan view of the carriage and extractor assembly shown in FIG. 6 with the extractor extended.

FIG. 11 is a side elevational view of the carriage and extractor assembly shown in FIG. 10 and with the extractor in an extended position.

FIG. 12 is a view taken along line 12—12 in FIG. 2.

FIG. 13 is a further enlarged view of a portion of the storage and retrieval machine shown in FIG. 2, showing attachment of the base of the machine to a drive belt.

FIG. 14 is a side elevational view of a carriage and extractor assembly including an alternative extractor construction shown with the extractor extended and the hoops lowered.

FIG. 15 is a top plan view of the carriage and extractor assembly shown in FIG. 14.

FIG. 16 is side elevational view of a portion of the carriage and extractor assembly shown in FIG. 14 but with the hoops raised.

FIG. 17 is a view similar to FIG. 16 showing the opposite side of the extractor.

FIG. 18 is an end elevational view (from the left in FIG. 14) of the extractor in the retracted condition.

FIG. 19 is a partial side elevational view similar to FIG. 14 of a second alternative extractor construction shown with the extractor extended and only one of the hoops lowered.

FIG. 20 is a partial perspective view of the automatic storage and retrieval system.

FIG. 21 is a reduced, partial top plan view of the automatic storage and retrieval system.

FIG. 22 is a side elevational view of the storage and retrieval system as shown in FIG. 21.

FIG. 23 is an enlarged, partially broken away, end elevational view of the shipping module as illustrated in FIG. 22 and with the storage and retrieval machine in the module.

FIG. 24 is a side elevational view of the shipping module as shown in FIG. 23.

FIG. 25 is a top plan view of the shipping module as shown in FIG. 24.

FIGS. 26-28 are perspective views of portions of the shipping module and storage and retrieval machine as illustrated in FIG. 24. FIG. 26 shows the upper shipping bracket attaching the top of the storage and retrieval machine to the upper rail section of the module; FIG. 27 shows the front shipping bracket attaching the front of the storage and retrieval machine (the right end in FIG. 24) to the module; and FIG. 28 shows the rear shipping bracket attaching the rear of the storage and retrieval machine (the left end in FIG. 24) to the module.

FIG. 29 is a side elevational view (from the right in FIG. 28) of the rear shipping bracket.

Figure 6:
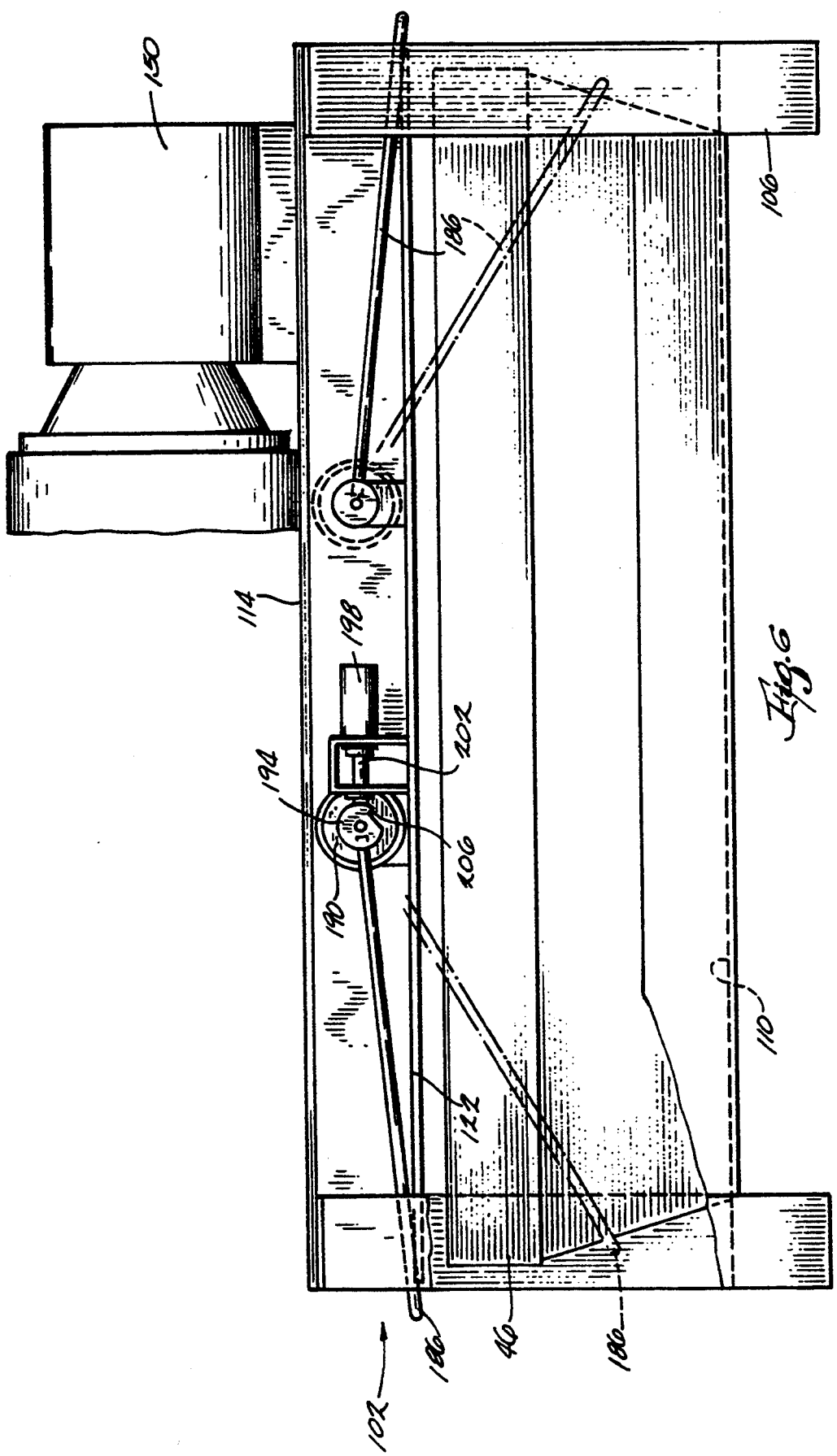
FIG. 6 is an enlarged view which is taken along line 6—6 in FIG. 1 and which shows the carriage and extractor assembly with the extractor in a retracted position.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

An automatic storage and retrieval system 10 embodying the invention is illustrated in the drawings. The system 10 stores and retrieves objects 46 such as letter trays or bins, for example, and is substantially identical to that disclosed in U.S. patent application Ser. No. 042,418, filed concurrently herewith and titled SYSTEM FOR AUTOMATICALLY STAGING LETTERS USED IN CONNECTION WITH LETTER SORTING MACHINE, the specification of which is herein incorporated by reference.

The automatic storage and retrieval system 10 includes means defining a plurality of storage or staging locations 66 (FIG. 1). While various storage location defining means can be employed, in the illustrated embodiment such means includes a modular storage rack 70. The storage rack 70 is made of modules 74. Each module 74 includes a frame 78, seven vertically spaced shelves 82, and cantilever supports 86 which are supported by the frame 78 and which support the shelves 82. As explained in the aforementioned patent application, the storage rack is mounted on top of a sweep rack which includes three levels of conveyors and which, for the purposes of this application, can be considered to be an integral part of the storage rack 70. Each shelf 82 has a continuous upwardly facing horizontal surface that defines a number of horizontally spaced storage locations 66. Use of the cantilever supports 86 allows the shelves 82 to be supported such that there are no partitions between adjacent storage locations 66. Thus, the storage rack 70 defines seven levels of storage locations, and a plurality of bays of storage locations, with each bay including seven vertically aligned storage locations. As shown in FIG. 20, one end of the storage rack 70 is defined by spaced vertical frame members 87a and 87b and by a horizontal cross member 87c extending between the upper ends of the members 87a and 87b.

The automatic storage and retrieval system 10 also includes (see FIG. 2) a track assembly 88. The track assembly 88 is supported on a suitable supporting surface such as the floor. In the embodiment illustrated in the drawings (see FIGS. 2-5), the track assembly includes a track that is preferably an elongated cylindrical rail member 88a extending horizontally adjacent the storage rack 70. The rail member 88a preferably comprises a number of sections (such as ten-foot sections) aligned end-to-end. The underside of the rail member 88a is fixed to support members 88b which are spaced axially along the rail member 88a and which are mounted on a channel-shaped base 88c. Suitable means such as fasteners 88d are provided to secure the components of the track assembly 88 together. The track assembly is preferably supported by cross ties 88e (see FIGS. 21 and 22) spaced along the length of the track. The automatic storage and retrieval system also includes (see FIGS. 2 and 20) a main upper rail 89 which is preferably supported by the storage rack 70. As shown in FIG. 20, one end of the upper rail 89 is fixed to the frame member 87c of the storage rack.

The automatic storage and retrieval system 10 also includes (see FIGS. 1 and 2) a storage and retrieval machine 90. The storage and retrieval machine 90 is operable to store objects 46 in and retrieve objects 46 from the storage locations 66 in the storage rack 70.

The storage and retrieval machine 90 includes a chassis or base 92, and means for supporting the base 92 for movement along the track assembly 88 so that the storage and retrieval machine 90 is horizontally moveable relative to the storage rack 70. While various supporting means can be employed, in the illustrated arrangement the supporting means includes (see FIG. 2) a pair of linear slide assemblies 93 supporting the base 92 on the rail member 88a. Referring to FIGS. 3 and 5, each slide assembly 93 includes a V-block 93a mounted (via fasteners 93b) to the underside of the base 92, and two oppositely axially inclined linear bearings or slides 93c mounted on the V-block 93a with fasteners 93d. The linear slides 93c provide substantially frictionless sliding engagement between the storage and retrieval machine 90 and the rail member 88a. Suitable slide assemblies are produced by Thomson Industries, Inc. of Port Washington, N.Y., and are sold under the name Roundway.

As shown in FIG. 2, the storage and retrieval machine 90 also includes a mast 94 extending vertically from the base 92, a carriage 98, and shuttle means for sliding a load onto and off the carriage 98 without exerting an upward force on the load. The upper end of the mast 94 is supported for movement along the upper rail 89 by a pair of wheels or rollers 99 (one is shown in FIG. 2) that are mounted on the mast 94. The shuttle means preferably extends above the load and includes (see FIG. 6) a shuttle or extractor mechanism 102 that is horizontally moveable relative to the carriage 98 for placing objects 46 in and extracting objects 46 from the storage locations 66 in the storage rack 70. While the illustrated system 10 has only one storage rack on one side of the storage and retrieval machine 90, it should be understood that the storage and retrieval machine 90 is capable of accessing a storage rack on the other side of the storage and retrieval machine 90 as well. Thus, the extractor 102 is extendable from both sides of the carriage 98.

To move the storage and retrieval machine 90 horizontally, means are provided for moving the base 92 along the rail member 88a. While various moving means can be employed, in the illustrated arrangement such means includes a drive mechanism 103. As shown in FIG. 2, the drive mechanism 103 includes drive and idler wheels or sprockets 103a and 103b, respectively, supported adjacent opposite ends of the rail member 88a, and a toothed belt 103c trained around the sprockets 103a and 103b and connected (FIG. 13) at its opposite ends to the opposite ends of the base 92 by a bolt or screw. The belt 103c is preferably a POLY CHAIN GT belt manufactured by Gates. A stationary motor 103d is drivingly connected to the drive sprocket 103a via a gear reducer to pull the storage and retrieval machine back and forth along the rail member 88a.

Means are also provided for supporting the carriage 98 on the mast 94 for vertical movement relative thereto. In the illustrated arrangement (see FIG. 2) the means for supporting the carriage 98 on the mast 94 includes a mounting assembly 104 including (see FIG. 12) a pair of spaced apart vertically extending cylindrical rods 104a and 104b. The rods 104a and 104b are fixed to a support bracket 104c that is mounted on the mast 94 by fasteners 104d or by other suitable means. The mounting assembly 104 also includes (FIG. 2) upper and lower bearing assemblies 104e for supporting the carriage 98 for vertical sliding movement along the rods 104a. The upper and lower bearing assemblies 104e are preferably identical and the upper bearing assembly is illustrated in more detail in FIG. 12. Each bearing assembly 104e includes a pair of spaced apart pillow blocks 104f and 104g fixed to the carriage 98, and a bushing, bearing or linear slide 104h mounted in each pillow block. The slide 104h in block 104f slideably receives the rod 104a, and the slide 104h in block 104g slideably receives the rod 104b. Each linear slide 104e extends in excess of 180° around the associated rod 104a or 104b.

Means are also provided for selectively moving the carriage 98 up and down the mast 94. In the illustrated arrangement (FIG. 2) the moving means includes a motor (not shown) supported on the base 92 for driving a drum 105a. The moving means also includes a pulley 105b rotatably supported on top of the mast 94, and a cable 105c reeved around the drum 105a and over the pulley 105b and connected to the carriage 98 via (FIG. 12) a mounting block 105d.

The carriage 98 and a first construction of the extractor 102 are more particularly illustrated in FIGS. 6 through 11. The carriage 98 includes (see FIGS. 6 and 7) a frame 106 providing an upwardly facing surface 110 for supporting an object 46. The extractor 102 includes an upper plate or top member 114 preferably fixed to the carriage frame 106 in upwardly spaced, parallel relation to the object supporting surface 110. The extractor 102 also includes an intermediate plate or member 118 which is located below the top member 114 and which is supported by the top member 114 for horizontal sliding movement relative thereto. The extractor 102 also includes a lower plate or bottom member 122 which is located below the intermediate member 118 and which is supported by the intermediate member 118 for horizontal sliding movement relative thereto and thus relative to the top member 114.

Figure 7:
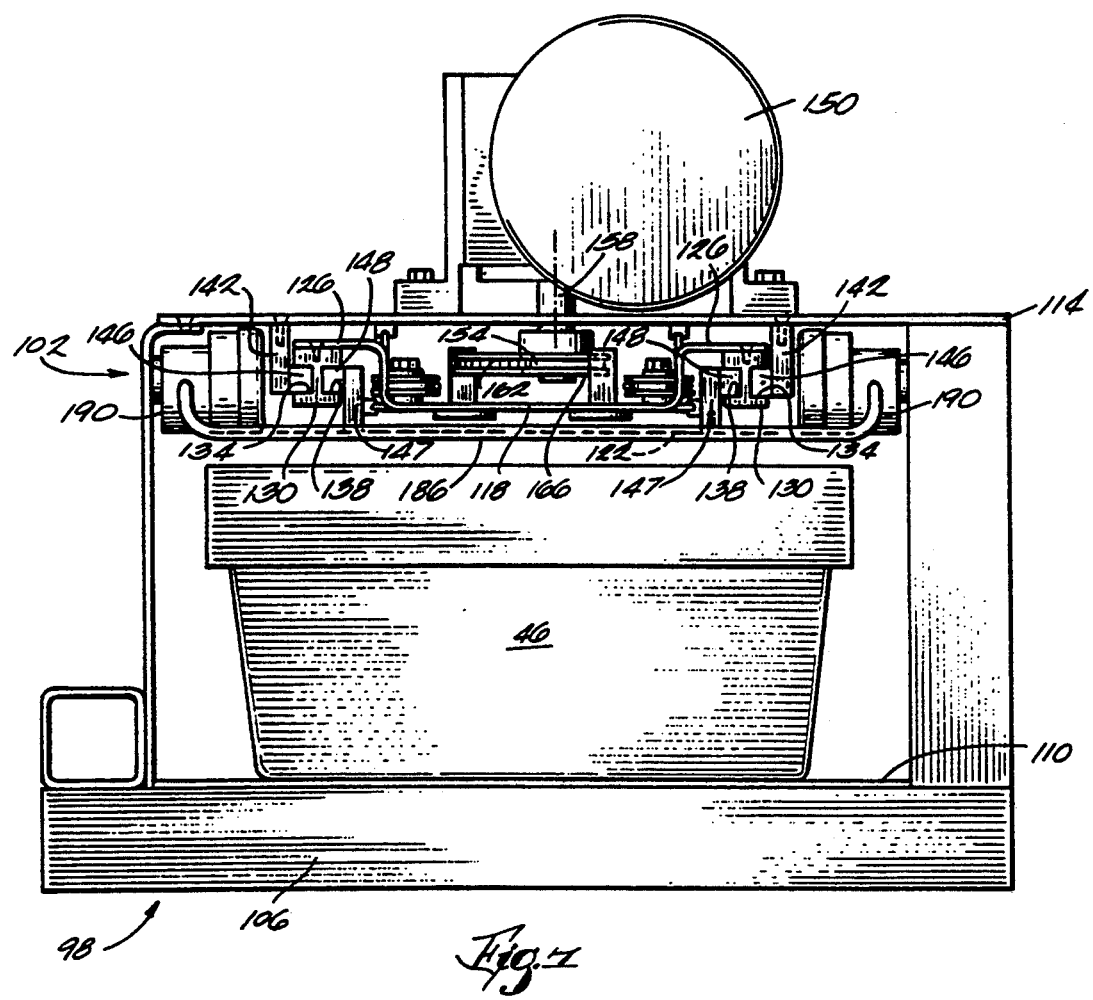
FIG. 7 is a left side elevational view of the carriage and extractor assembly shown in FIG. 6.

More particularly, as best shown in FIG. 7, the intermediate member 118 includes, adjacent each corner thereof, an upwardly offset, horizontally extending mounting flange 126. Extending downwardly from each of the flanges 126 is an H-shaped bearing block or slide 130 defining both an outwardly opening bearing track 134 and an inwardly opening bearing track 138. A pair of bearing supporting members 142 extend downwardly from the top member 114. One of the bearing supporting members 142 has mounted thereon an upper slide or bearing strip 146 slidably received in the bearing track 134 of one of the bearing blocks 130, and the other bearing supporting member 142 has mounted thereon a bearing strip 146 slidably received in the bearing track 134 of the other bearing block 130. The bearing strips 146 support the intermediate member 118 for horizontal sliding movement relative to the top member 114. Similarly, a pair of bearing supporting members 147 extend upwardly from the bottom member 122. One of the bearing supporting members 147 has mounted thereon a lower slide or bearing strip 148 slidably received in the bearing track 138 of one of the bearing blocks 130, and the other bearing supporting member 147 has mounted thereon a bearing strip 148 slidably received in the bearing track 138 of the other bearing block 130. The bearing strips 148 support the bottom member 122 for horizontal sliding movement relative to the intermediate member 118. The bearing strips 146 and 148 can be made of any suitable low-friction material.

Means are provided for extending and retracting the extractor 102, i.e., for causing sliding movement of the intermediate and bottom members 118 and 122 relative to the top member 114. While various extending and retracting means can be employed, in the illustrated arrangement this means includes (see FIGS. 6 and 7) a drive motor 150 mounted on the top member 114. The motor 150 is reversible and drives a sprocket 154 (FIGS. 9 and 10) which is located below the top member 114 and which rotates about a vertical axis 158. The means for extending and retracting the extractor 102 also includes an idler sprocket 1 rotatably supported by the top member 114, and a drive chain 166 which is driven by the drive sprocket 154, which passes around the idler sprocket 1, which has a first end fixed to the intermediate member 118 adjacent the right end thereof (as shown in FIG. 8), and which has a second end fixed to the intermediate member 118 adjacent the left end thereof (as shown in FIG. 8). Thus, as is apparent from viewing FIGS. 8 and 10, clockwise rotation of the drive sprocket 154 pulls the intermediate member 118 to the left relative to the top member 114, and counterclockwise rotation of the drive sprocket 154 pulls the intermediate member 118 to the right relative to the top member 114.

The means for extending and retracting the extractor 102 also includes (see FIGS. 8 and 10) an idler pulley 170 pivotally mounted on the intermediate member 118, a cable 174 which is reeved around the pulley 170 and which has one end fixed to the top member 114 and an opposite end fixed to the bottom member 122, an idler pulley 178 rotatably mounted on the intermediate member 118, and a cable 182 which is reeved around the pulley 178 and which has one end fixed to the top member 114 and an opposite end fixed to the bottom member 122. As is apparent from viewing FIG. 8, movement of the intermediate member 118 to the left causes movement of the pulley 170 relative to the top member 114, and such movement of the pulley 170 causes the cable 174 to pull the bottom member 122 to the left relative to the intermediate member 118. Movement of the intermediate member 118 to the right relative to the top member 114 causes movement of the pulley 178 to the right relative to the top member 114, and such movement of the pulley 178 causes the cable 182 to pull the bottom member 122 to the right relative to the intermediate member 118. The cable and pulley arrangements cause the bottom member 122 to move twice as fast as the intermediate member 118.

Thus, clockwise rotation of the drive sprocket 154 causes movement of the intermediate member 118 and bottom member 122 to the left (as shown in FIG. 8), and counterclockwise rotation of the drive sprocket causes movement of the intermediate member 118 and bottom member 122 to the right.

Accordingly, the extractor 102 is operable between a retracted condition (FIG. 6) and an extended condition (FIGS. 10 and 11). In the retracted condition, the intermediate and bottom members 118 and 122 are aligned directly beneath the top member 114 and contained within the carriage so that the members are out of the way and protected during movement of the carriage. In the extended condition, the intermediate member 118 extends outwardly in one direction relative to the top member 114, and the bottom member 112 extends outwardly in the same direction relative to the intermediate member 118.

Means are provided on the bottom member 122 for selectively engaging an object 46 (e.g., a letter tray) beneath the bottom member 122 so that the object moves horizontally in common with the bottom member 122. While the engaging means can be configured to move various objects to permit the storage and retrieval device 90 to be used in other applications, in the illustrated arrangement the engaging means includes (see FIGS. 6, 8, 10 and 11) a pair of generally U-shaped members or hoops 186 each having opposite ends pivotally mounted on the bottom member 122. Referring to FIG. 6, each of the hoops 186 is pivotally moveable between an upper position (shown in solid lines) wherein it extends substantially parallel to the bottom member 122, and a lower position (shown in phantom) wherein it extends transversely and downwardly relative to the bottom member 122. When the hoops 186 are in their upper positions, the bottom member 122 can pass over an object 46 located in the storage rack 70 without interference between the hoops 186 and the object 46. When the hoops 186 are moved to their lower positions, each of the hoops 186 is engageable with a respective end of the object 46 so as to substantially prevent horizontal movement of the object 46 relative to the bottom member 122.

Means are provided for selectively pivoting the hoops 186 relative to the bottom member 122. Such means preferably includes means for simultaneously moving the hoops 186 to their upper positions and for simultaneously moving the hoops 186 to their lower positions. While various hoop pivoting means can be employed, in the embodiment illustrated in FIGS. 6, 8, 10 and 11 such means includes, for each of the hoops 186, a torsional motor or solenoid 190 (FIGS. 6 and 8) which is mounted on the bottom member 122 for movement therewith and which is drivingly connected to one end of the hoop. The solenoid 190 is biased so as to bias the hoop to its upper position, and actuation of the solenoid 190 causes movement of the hoop to its lower position. Means are provided for selectively retaining the hoop in its lower position. This means preferably includes (see FIGS. 6 and 11) a cam 194 fixed to the hoop for pivotal movement therewith about the solenoid axis, and a linear motor or solenoid 198 having an outwardly biased plunger 202 engaging the cam 194. When the hoop moves to its lower position, pivotal movement of the cam allows the plunger 202 to "fall off" a step 206 on the cam, and the plunger thereafter interferes with the step so as to prevent pivotal movement of the cam and the hoop in the opposite direction. Engagement of the step 206 by the plunger 202 therefore prevents movement of the hoop from its lower position. Accordingly, neither of the solenoids needs to be actuated in order to retain the hoop in its lower position. In order to return the hoop to its upper position, the linear solenoid is actuated. This retracts the plunger so that the plunger 202 no longer interferes with the step 206, and this allows the natural bias of the torsional solenoid 190 to return the hoop to its upper position.

This arrangement minimizes the amount of electricity needed to operate the hoops 186. The torsional solenoids 190 naturally bias the hoops 186 to their upper positions. Only a momentary current is necessary to move the hoops 186 to their lower positions. Thereafter, the spring bias of the linear solenoids 198 retains the hoops 186 in their lower positions. Only a momentary actuation of the linear solenoids 198 is necessary to return the hoops 186 to their upper positions. Once the steps 206 clear the plungers 202 of the linear solenoids 198, the linear solenoids 198 can be deactivated.

The carriage and extractor assembly operates as follows. When the supporting surface 110 of the carriage is aligned with a shelf 82 in the storage rack 70, the drive sprocket 154 is rotated clockwise so as to extend the bottom member 122 above an object 46 on the shelf. The hoops 186 (or only the outer hoop if the third embodiment is employed) are then moved to their lower positions to capture the object 46, and the drive sprocket is rotated counterclockwise so as to retract the bottom member 122. Engagement of the object 46 by the hoops 186 causes the object 46 to move with the bottom member 122 and slide off the shelf onto the carriage supporting surface 110. Location of the bottom member 122 immediately above the object 46 substantially prevents letters from coming out of the object 46 during movement of the object 46. The hoops 186 remain in their lower positions during movement of the carriage relative to the storage rack 70.

To prevent the storage and retrieval machine 90 from being derailed, means are provided on the base 92 for preventing its upward movement relative to the rail member 88a. While various movement prevention means can be employed, in the illustrated arrangement such means includes (see FIG. 2) a pair of retainer assemblies 208 positioned outside of the slide assemblies 93 adjacent the opposite ends of the base 92. As shown in FIGS. 3 and 4, each retainer assembly 208 includes a mounting or pillow block 208a fixed to the base 92 by suitable means such as fasteners or bolts 208b, and an arcuate bushing, bearing or slide that operates as a retainer 208c. The retainer 208c includes an inner bearing surface 208d that extends beneath the rail member 88a and in excess of 180° around the rail member 88a to provide an opening 208e adjacent the underside of the rail member 88a. The bearing surface 208d defines a bore which communicates with the opening 208e and through which the rail member 88a extends. The opening 208e accommodates the support members 88b. During normal operation of the storage and retrieval machine 90, the bearing surface 208d preferably remains slightly spaced from the rail member 88a, slideably contacting the rail member 88a only when the base 92 becomes slightly misaligned with respect to the rail member 88a.

An alternative extractor or shuttle mechanism 602 is illustrated in FIGS. 14–18. Except as described below, the shuttle mechanism 602 is identical to the shuttle mechanism 102, and common elements have been given the same reference numerals.

In the shuttle mechanism 602, the opposite ends of the hoop 186A are designated by reference numerals 604 and 606, and the opposite ends of the hoop 186B are designated by reference numerals 608 and 610. The end 604 of the hoop 186A has thereon (see FIG. 17) a downwardly extending pivot arm 612, and the end 608 of the hoop 186B has thereon an upwardly extending pivot arm 614. The end 606 of the hoop 186A has thereon (see FIG. 16) an upwardly extending pivot arm 116, and the end 610 of the hoop 186B has thereon a downwardly extending pivot arm 618.

In the shuttle mechanism 602, the means for moving the hoops 186 includes (see FIG. 17) a first link 620 extending between the pivot arms 612 and 614 (and thus between the hoops 186A and 186B). The means for moving the hoops 186 also includes (see FIG. 16) a second link 622 extending between the pivot arms 616 and 618 (and thus between the hoops 186A and 186B). Each of the links 620 and 622 is movable substantially longitudinally in opposite directions. The means for moving the hoops 186 also includes a motor 626 fixed against horizontal movement relative to the carriage 98. The motor 626 is preferably fixed to the upper plate 114. The motor 626 is preferably a reversible brake motor having (see FIG. 15) a horizontally extending output shaft 630 having opposite ends 632 and 634. The shaft end 632 has thereon (see FIG. 17) a downwardly extending lever arm 636, and the shaft end 634 has thereon (see FIG. 16) a downwardly extending lever arm 638. The means for moving the hoops 186 also includes means for drivingly connecting the motor 626 to the hoops 186. Such connecting means preferably includes a cable and pulley arrangement connecting the lever arm 636 to the link 620 and a cable and pulley arrangement connecting the lever arm 638 to the link 2.

The cable and pulley arrangement connecting the lever arm 636 to the link 620 includes (see FIGS. 15 and 17) a pulley 640 pivotally mounted on the upper plate 114 and fixed against horizontal movement relative thereto, and a pulley 644 pivotally mounted on the intermediate plate 118 and fixed against horizontal movement relative thereto. The pulley 640 rotates in a vertical plane, and the pulley 644 rotates in a non-vertical and non-horizontal plane as best shown in FIG. 18. A cable 648 is trained over the pulleys 640 and 644 and has one end fixed to the lower end of the lever arm 636 and an opposite end fixed to the upper end of the pivot arm 614. As seen in FIG. 17, counterclockwise movement of the lever arm 636 acts through the cable 648 to cause clockwise movement of the pivot arm 614 and thereby pivots the hoops 186 to their upper positions.

The cable and pulley arrangement connecting the lever arm 638 to the link 622 includes (see FIGS. 15 and 16) a pulley 652 pivotally mounted on the upper plate 114 and fixed against horizontal movement relative thereto, a pulley 656 pivotally mounted on the intermediate plate 118 and fixed against horizontal movement relative thereto, and a pulley 660 pivotally mounted on the lower plate 122 and fixed against horizontal movement relative thereto. The pulleys 652 and 660 rotate in a vertical plane, and the pulley 656 rotates in a non-vertical and non-horizontal plane as best shown in FIG. 18. A cable 664 is trained over the pulleys 652, 656 and 660 and has one end fixed to the lower end of the lever arm 638 and an opposite end fixed to the upper end of the pivot arm 616. As seen in FIG. 16, counterclockwise movement of the lever arm 638 acts through the cable 664 to move the pivot arm 616 counterclockwise and thereby pivots the hoops 186 to their lower positions.

A second alternative extractor or shuttle mechanism 702 is partially illustrated in FIG. 19. Except as described below, the shuttle mechanism 702 is identical to the shuttle mechanism 602, and common elements have been given the same reference numerals.

In the shuttle mechanism 702, the pivot arms 612, 614, 616 and 618 all extend upwardly so that longitudinal movement of either link 620 or 622 causes one of the hoops 186 to move to its upper position and causes the other hoop 186 to move to its lower position. For example, as seen in FIG. 19, counterclockwise movement of the lever arm 616 moves the hoop 186A to its lower position and moves the hoop 186B to its upper position.

The automatic storage and retrieval system 10 preferably further comprises a combination maintenance and shipping module 800 fixed adjacent one end of the track 88a. Although the module 800 is not illustrated in FIG. 1, the module 800 is preferably fixed adjacent the right end of the track 88 as shown in FIG. 1. As shown in FIGS. 20-25, the module 800 includes a frame 804. The frame 804 defines a rectangular solid or box-like structure and comprises four vertical corner members 808, 809, 810 and 811. Four horizontal base members 818, 819, 820 and 821 extend between the lower ends of the corner members 808, 809, 810 and 811, and four horizontal top members 828, 829, 830 and 831 extend between the upper ends of the corner members 808, 809, 810 and 811. Between each pair of adjacent corner members 808, 809, 810 and 811 is a vertical intermediate member 838, 839, 840 or 841 extending between the associated base and top members. The corner members 808 and 809 and the intermediate member 838 have thereon (see FIGS. 21-25) casters or rollers 848, the reason for which is explained below. The casters 848 are not shown in FIG. 20. A plurality of horizontal support members 852 extend parallel to the base members 818 and 820 and between the base members 819 and 821. A number of brace members 856 extend between various of the aforementioned frame members to rigidify the frame 804. The frame 804 is secured to the storage rack 70 by suitable means such as bolts 860 securing the corner member 811, the top member 830 and the intermediate member 840 to the end of the storage rack. The lower end of the frame 804 is preferably supported on leveling feet (not shown).

The module 800 is located adjacent the end of the track 88a. Preferably, a section of the track 88a extends into the module 800 and is supported by the support members 852 of the module 800. In an alternative embodiment (not shown), the module 800 can include a separate section of track which is permanently secured to the module 800 and which is aligned end-to-end with the track 88a.

As shown in FIGS. 23 and 24, the module 800 also includes an upper maintenance rail 864 aligned end-to-end with the upper main rail. The upper maintenance rail 864 is fixed to the underside of at least the top members 828 and 830.

As shown in FIGS. 20-22, the motor 103d and the drive sprocket 103a are located within the module 800 and are supported by the lower end of the frame 804. This enables the storage and retrieval machine 90 to be moved automatically into the module 800. A conventional bumper or shock absorber 868 is bolted to a mounting plate 872 that is also supported by the lower end of the frame 804.

The module 800 further includes (see FIGS. 24 and 25) a control 876 for the storage and retrieval machine 90. The control 876 is preferably located within a metal enclosure supported by the frame 804 and includes a power source, drives for the onboard motors, and a computer for controlling the storage and retrieval machine 90. (The computer control system is described in the aforementioned application titled REAL-TIME INTERRUPT DRIVEN PC CONTROL FOR A STORAGE AND RETRIEVAL MACHINE.) Flexible cables 880 (see FIGS. 21 and 24) connect the control 876 to the storage and retrieval machine. The cables 880 extend within a protective metal conduit 884 (see FIG. 21) from the control 876 to approximately the mid-point of the track 88a. From the end of the conduit 884 to the storage and retrieval machine, the cables 880 extend within a chain-like, flexible track 888. A portion of the track 888 lies inside an upwardly opening channel 892 extending parallel to the track 88a. Referring to FIG. 21, the right end of the flexible track 888 is fixed adjacent the end of the conduit 884. As shown in FIGS. 22 and 24, the other end of the flexible track 888 is doubled over itself and connected to the storage and retrieval machine, so that the track 888 is free to move in response to movement of the storage and retrieval machine 90.

The automatic storage and retrieval system 10 is tested and assembled as follows.

The permanent track assembly 88 and the permanent storage rack 70 are assembled on site, while the storage and retrieval machine 90 is assembled off site, i.e., at the manufacturing location. The machine 90 is also tested off site, i.e., at the manufacturer's testing facility. The machine 90 is tested on a test apparatus (not shown) including a test track and a test storage rack fixed adjacent the test track. The test track and test storage rack can be identical to the permanent track 88 and storage rack 70, although they do not have to be identical. The test track includes an idler wheel that is preferably identical to the idler wheel 103b. The test storage rack includes an upper rail similar to the main upper rail 89. The shipping module 800 is fixed adjacent the end of the test track (e.g., in the same manner as described above). A belt similar to the belt 103c is connected to the machine 90 and is trained around the drive wheel 103a and the idler wheel of the test track. The control 876 is connected to the machine 90 as described above so that the machine 90 is fully operational on the test track. The test storage rack is then used to test the machine 90. The shipping module 800 serves as a maintenance area for the storage and retrieval machine 90 during testing.

After testing, the machine 90 is secured for shipping in the shipping module 800 (see FIGS. 23-25). The bumper 868 is removed from its mounting plate 872 and the machine 90 is moved completely into the module 800. Next, the rollers 99 are removed from the upper end of the mast 94 and replaced by an upper shipping bracket 900 (see FIG. 26). The bracket 900 is secured to the mast by bolts 904 extending into the same holes as the bolts securing the rollers 99 to the mast 94. The bracket 900 includes an adaptor plate 908 having therein slots receiving the bolts 904. The slots allow horizontal adjustment of the position of the plate 908 relative to the mast 94. The bracket 900 also includes an angle member 912 secured to the plate 908 by bolts 916. The angle member 912 has a horizontal portion 920 having therein slots receiving the bolts 916. The slots allow horizontal adjustment (in the direction perpendicular to the direction in which the plate 908 is adjustable) of the position of the member 912 relative to the plate 908. The angle member 912 also has a vertical portion 924 having therein slots receiving bolts 928 that are secured to the upper maintenance rail 864. The slots allow vertical adjustment of the position of the member 912 relative to the rail 864.

Once the upper shipping bracket 900 is secured, the retainers 208 are disconnected from the base 92 by removing the bolts 208b, the section of track 88a extending into the module 800 is removed, and the linear slides 93 are removed from the base 92. Front and rear shipping brackets 932 and 936 (see FIGS. 27–29) are then secured to the base 92 in place of the front and rear retainers 208. Each bracket 932 or 936 is secured to the base 92 by bolts 940 extending into the same holes as the bolts securing the associated retainer to the base. Each bracket 932 or 936 is then secured to the module 800 in a manner described below.

More particularly, the front shipping bracket 932 has (see FIG. 27) a vertical portion 944 secured to the base 92 by the bolts 940. The vertical portion 944 has therein a notch 948 through which the track 88 extends when the module 800 is secured to the permanent storage rack 70. The bracket 932 also has horizontal portions 952 fixed to the module base member 820 by bolts 956, and gusset portions 958 extending between the vertical portion 944 and the horizontal portions 952.

The rear shipping bracket 936 has (see FIGS. 28 and 29) a vertical portion 960 secured to the base 92 by the bolts 940. The vertical portion 960 also has therein (see FIG. 29) a hole 962 through which a bolt 964 (see FIG. 28) extends. The bolt 964 is secured to the bracket 936 by nuts 966, and the head of the bolt 964 engages the mast 94 for reasons explained below. The bracket 936 also has a horizontal portion 968 fixed to the bumper mounting plate 872 by bolts 970 extending into the same holes as the bolts that secure the bumper 868 to the plate 872. A gusset portion 972 extends between the vertical and horizontal portions.

The machine 90 is further secured for shipping by placing a block of wood 974 (see FIG. 24) or other suitable material between the carriage 98 and the base 92 and then wrapping a strap 976 around the base and the lower portion of the carriage. This substantially prevents movement of the carriage 98 during shipping. Also, the control cables 880 and the flexible track 888 are rolled up and secured within the module 800.

Next, the shipping module 800 is removed from the test apparatus by disconnecting the module 800 from the test rack. The module 800 is then tipped until it is supported by the casters 848. When the module 800 is tipped on its side in this manner, the part of the mast 94 that engages the bumper 868 during operation of the machine engages the bolt 964. The bolt 964 thus provides additional support for the machine 90. The casters 848 facilitate movement of the module 800 over the floor. The storage and retrieval machine 90 is then shipped to the site in the shipping module 800. The control 876 and the motor 103d remain in the module 800 during shipping.

At the site, the shipping module 800 is connected to the permanent storage rack 70 as described above, the cables 880 and the flexible track 888 are connected as described above, and the control 876 is connected to the site power source. Also, the shipping brackets 900, 932 and 936 are removed and replaced by the rollers 99 and the retainers 208, and the linear slides 93 are secured to the base 92. Because the machine 90 has already been tested, it is ready for operation. The module 800 provides a maintenance area for the storage and retrieval machine 90.

Various features of the invention are set forth in the following claims.

We claim:

1. A method of assembling an automatic storage and retrieval system, said method comprising the steps of
    assembling a storage rack on site, said rack defining a plurality of storage locations,
    assembling a storage and retrieval machine off site,
    securing said storage and retrieval machine in a shipping container,
    shipping said storage and retrieval machine to the site in said shipping container, and
    connecting said shipping container to said storage rack such that said storage rack, said storage and retrieval machine and said container define the automatic storage and retrieval system, wherein said storage and retrieval machine is movable out of said container and is operable to place objects in and remove objects from said storage locations of said storage rack, and such that said storage and retrieval machine is thereafter movable into said container so that said container provides a maintenance area for said storage and retrieval machine.

2. A method as set forth in claim 1 wherein said machine includes a base movable along said track, wherein said container includes a motor for moving said base along said track, and wherein said shipping step includes the step of shipping said motor in said container.

3. A method as set forth in claim 1 wherein said machine includes a base movable along said track, and a retainer for preventing upward movement of said base relative to said track, and wherein said securing step includes the steps of removing said retainer from said base, replacing said retainer with a bracket, and fixedly connecting said bracket to said container.

4. A method as set forth in claim 3 wherein said container includes a bumper for limiting horizontal movement of said storage and retrieval machine, and wherein said step of connecting said bracket to said container includes the steps of removing said bumper and connecting said bracket to said container in place of said bumper.

5. A method as set forth in claim 1 wherein said machine includes a base movable along said track, and a motor mounted on said base, wherein said container includes a control for said motor, and wherein said shipping step includes the step of shipping said control in said container.

6. A method as set forth in claim 5 wherein said machine also includes a flexible cable connecting said control to said motor, and wherein said shipping step also includes the step of shipping said cable in said container.

7. A method as set forth in claim 1 wherein said assembling step also includes the step of assembling an upper rail on site, wherein said machine includes a mast, and a roller for guiding said mast along said upper rail, and wherein said securing step includes the steps of removing said roller from said mast and replacing said roller with a bracket fixedly connecting said mast to said container.

8. A method of testing and assembling an automatic storage and retrieval system, said method comprising the steps of
    assembling a permanent track and a permanent storage rack on site, said permanent track having an end, said permanent rack defining a plurality of storage locations,
    assembling a storage and retrieval machine off site,
    testing said machine off site on a test apparatus including a test track which has an end, a test storage rack which is fixed adjacent said test track, and a shipping module for packaging said storage and retrieval machine for shipping, said shipping module being fixed adjacent said end of said test track so that said shipping module serves as a maintenance area for said storage and retrieval machine during testing, securing said storage and retrieval machine in said shipping module, removing said shipping module from said test apparatus, shipping said storage and retrieval machine to the site in said shipping module, and connecting said shipping module to said permanent storage rack adjacent said end of said permanent track such that said permanent track, said permanent storage rack, said storage and retrieval machine and said module define the automatic storage and retrieval system, wherein said storage and retrieval machine is movable out of said module onto said permanent track and is operable to place objects in and remove objects from said storage locations of said storage rack, and such that said storage and retrieval machine is thereafter movable into said container so that said module provides a maintenance area for said storage and retrieval machine.

9. A method as set forth in claim 8 wherein said machine includes a base movable along said tracks, wherein said shipping module includes a motor for moving said base along said tracks, and wherein said shipping step includes the step of shipping said motor in said shipping module.

10. A method as set forth in claim 8 wherein said machine includes a base movable along said tracks, and a retainer for preventing upward movement of said base relative to said tracks, and wherein said securing step includes the steps of removing said retainer from said base, replacing said retainer with a bracket, and fixedly connecting said bracket to said shipping module.

11. A method as set forth in claim 10 wherein said module includes a bumper for limiting horizontal movement of said storage and retrieval machine, and wherein said step of connecting said bracket to said module includes the steps of removing said bumper and connecting said bracket to said module in place of said bumper.

12. A method as set forth in claim 8 wherein said machine includes a base movable along said tracks, and a motor mounted on said base, wherein said shipping module includes a control for said motor, and wherein said shipping step includes the step of shipping said control in said shipping module.

13. A method as set forth in claim 12 wherein said machine also includes a flexible cable connecting said control to said motor, and wherein said shipping step also includes the step of shipping said cable in said shipping module.

14. A method as set forth in claim 8 wherein said assembling step also includes the step of assembling an upper rail on site, wherein said machine includes a mast, and a roller for guiding said mast along said upper rail, and wherein said securing step includes the steps of removing said roller from said mast and replacing said roller with a bracket fixedly connecting said mast to said shipping module.

15. A method as set forth in claim 8 wherein said machine includes a base movable along said permanent track, wherein said module includes a motor for moving said base along said permanent track, and wherein said system further comprises a belt drivingly connecting said motor to said base.

16. A method as set forth in claim 15 wherein said permanent track has an opposite end, wherein said system further comprises an idler wheel adjacent said opposite end, wherein said module also includes a drive wheel driven by said motor, and wherein said belt is trained around said idler and drive wheels.

17. A method as set forth in claim 8 wherein said permanent track extends into said module.

18. A method as set forth in claim 17 wherein said system further comprises a upper main rail fixed relative to said storage rack, wherein said module includes an upper maintenance rail aligned with said upper main rail, and wherein said machine has an upper end supported for movement along said upper rails.

19. A method as set forth in claim 8 wherein said module includes rollers facilitating movement of said module.

20. A method as set forth in claim 8 wherein said machine includes a base movable along said permanent rail, a generally vertical mast supported by said base, a carriage movable vertically along said mast, and an extractor mechanism which is supported by said carriage and which is operable to place objects in and remove objects from said storage locations.

* * * * *